United States Patent [19]

Perrier

[11] Patent Number: 5,253,910
[45] Date of Patent: Oct. 19, 1993

[54] GRIPPER CLAMP AND MACHINE FOR TREATING OBJECTS, PARTICULARLY BOTTLES, EQUIPPED THEREWITH

[76] Inventor: René Perrier, 91, rue Fernand Lafont, 07160 Le Cheylard, France

[21] Appl. No.: 777,420
[22] PCT Filed: Apr. 10, 1991
[86] PCT No.: PCT/FR91/00292
    § 371 Date: Dec. 6, 1991
    § 102(e) Date: Dec. 6, 1991
[87] PCT Pub. No.: WO91/15309
    PCT Pub. Date: Oct. 17, 1991

[30] Foreign Application Priority Data

Apr. 11, 1990 [FR] France .................. 90 04652

[51] Int. Cl.⁵ ............................................. B66C 1/42
[52] U.S. Cl. ................................ 294/116; 294/115
[58] Field of Search ............ 294/115, 116, 117, 87.2, 294/87.22, 87.24, 106

[56] References Cited

U.S. PATENT DOCUMENTS

| | | | |
|---|---|---|---|
| 1,575,185 | 3/1926 | Stenhouse | 294/115 X |
| 1,625,930 | 3/1927 | Astrom | |
| 1,943,004 | 1/1934 | Coppage | 294/87.24 |
| 1,958,846 | 5/1934 | Christensen | |
| 3,219,376 | 11/1965 | Peters | 294/116 X |
| 4,179,145 | 12/1979 | Shinsako | 294/115 X |
| 4,257,567 | 3/1981 | Hasquenoph et al. | 294/106 X |
| 4,348,044 | 9/1982 | Wood, III | 294/115 X |
| 4,519,279 | 5/1985 | Ruggeri | 294/116 X |
| 4,667,998 | 5/1987 | Borcea et al. | 294/116 X |
| 4,886,635 | 12/1989 | Forster et al. | 294/116 X |
| 5,040,836 | 8/1991 | Roudaut | 294/116 X |

FOREIGN PATENT DOCUMENTS

| | | | |
|---|---|---|---|
| 481571 | 8/1953 | Italy | 294/87.22 |
| 1484703 | 6/1989 | U.S.S.R. | 294/116 |

Primary Examiner—David M. Mitchell
Assistant Examiner—Dean J. Kramer
Attorney, Agent, or Firm—Young & Thompson

[57] ABSTRACT

Gripper jaws (38) for bottles are movable between a gripping and a release position. Passage to the release position is controlled by a slide (42) through the action of a ramp (48) and via tenons (44) connected to the slide (42) and sliding in slots (46). The reverse movement is controlled by the same members through the action of a return spring acting on the slide (42). The transmission of movement effected by the systems comprising tenons (44) and slots (46), is irreversible so that the neck (2) of a bottle held between the jaws (38) cannot be disengaged therefrom: a force (F1) applied to the jaws (38) does not enable the slide to be moved in the direction of opening of the jaws (38). Utilization for producing high-speed machines without increasing the clamping force on the objects (bottles) treated.

3 Claims, 5 Drawing Sheets

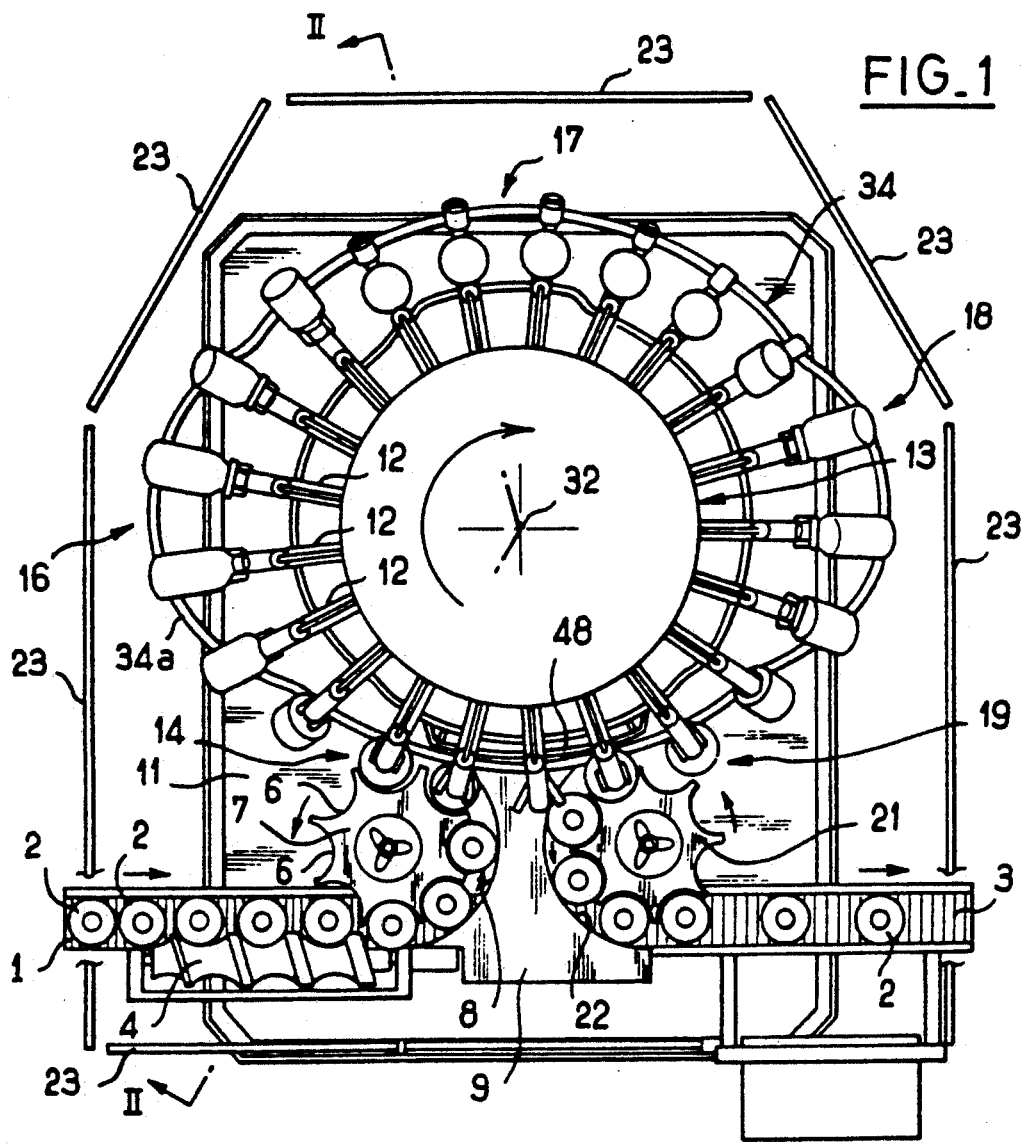
FIG_1
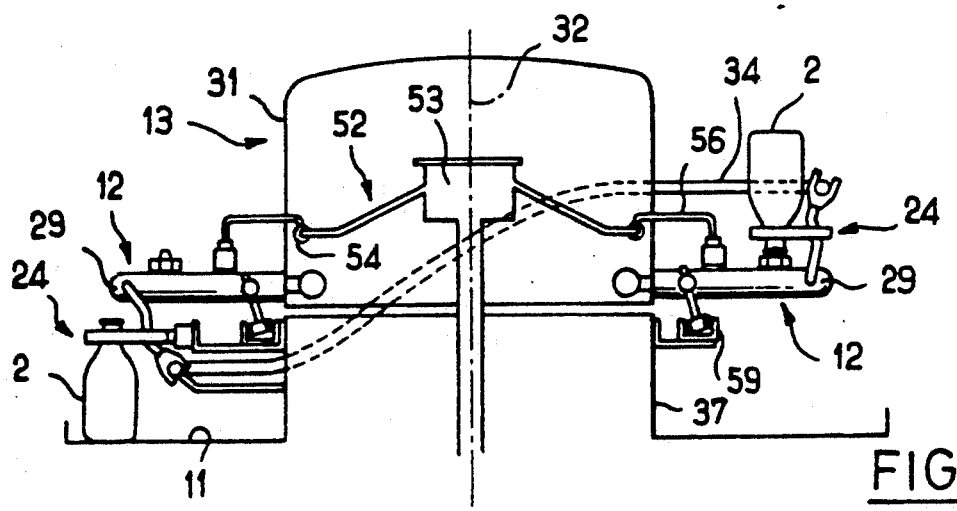
FIG_2

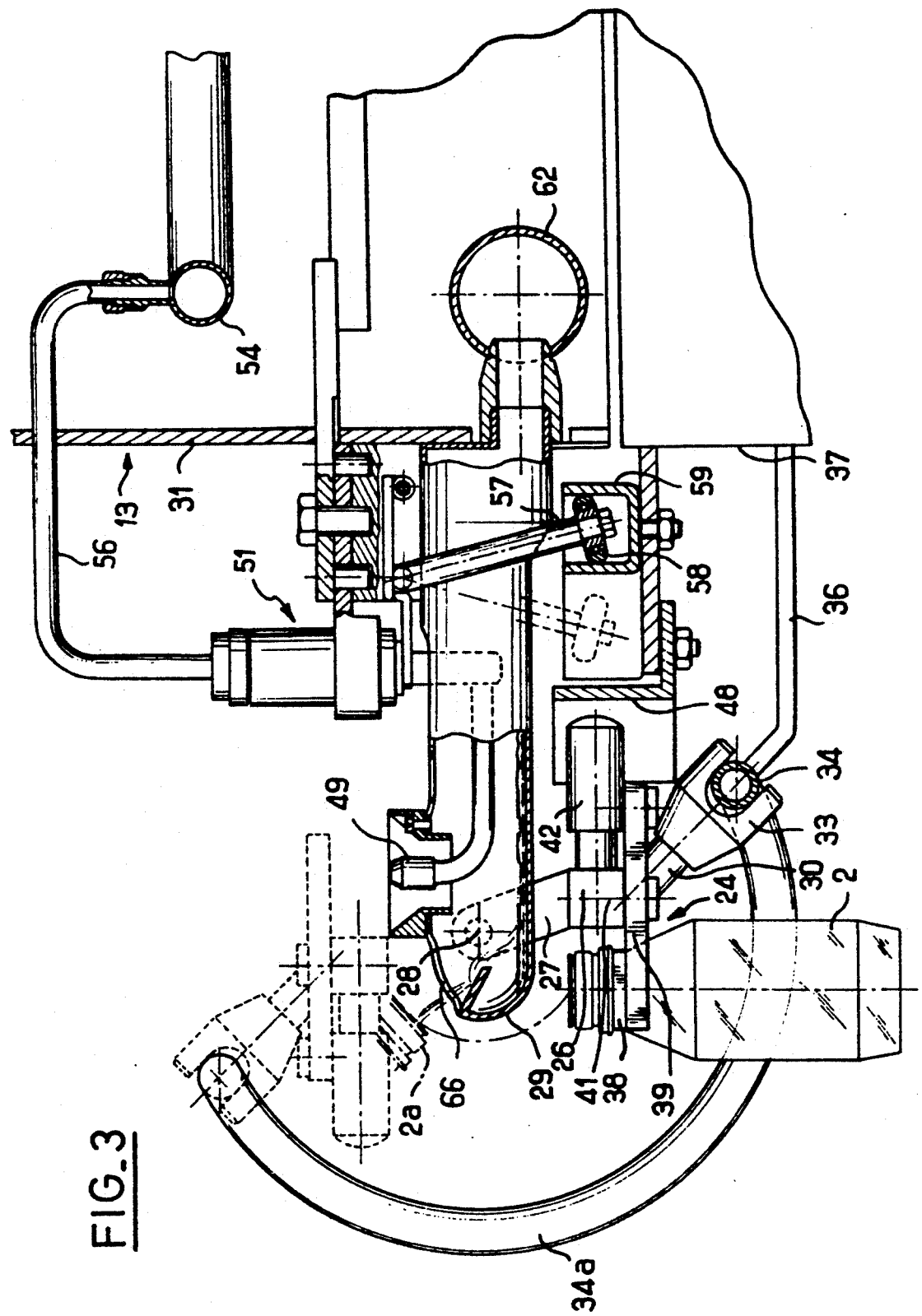
FIG._3

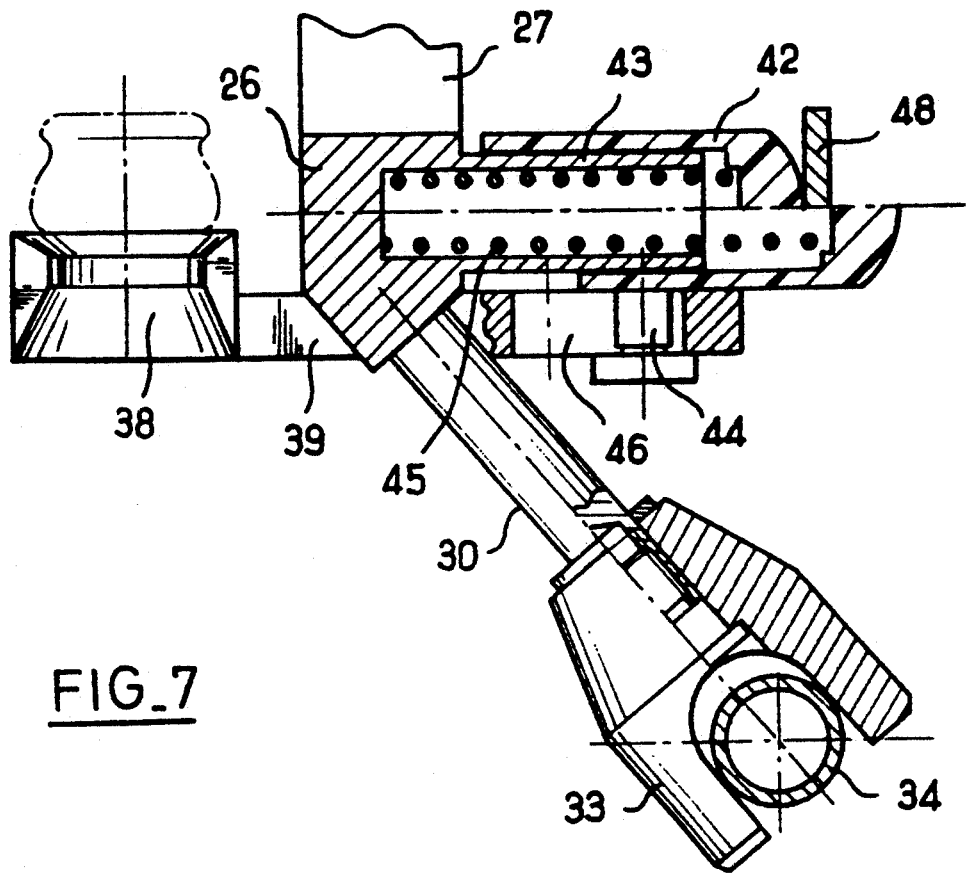
FIG_7
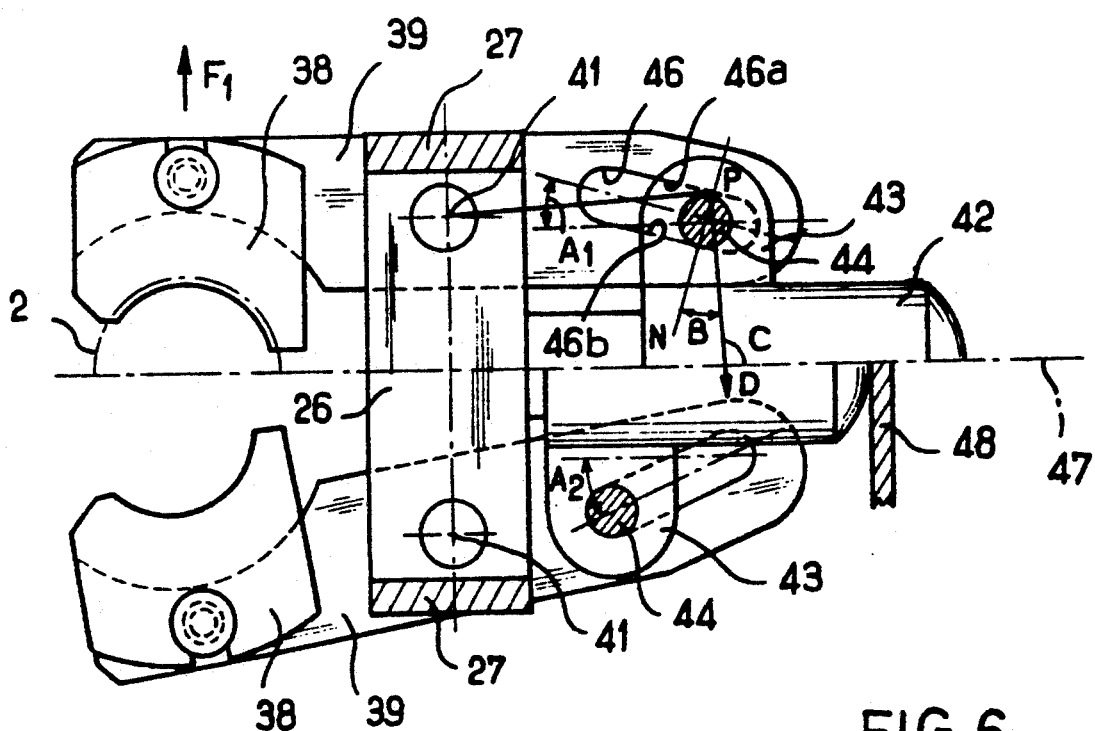
FIG_6

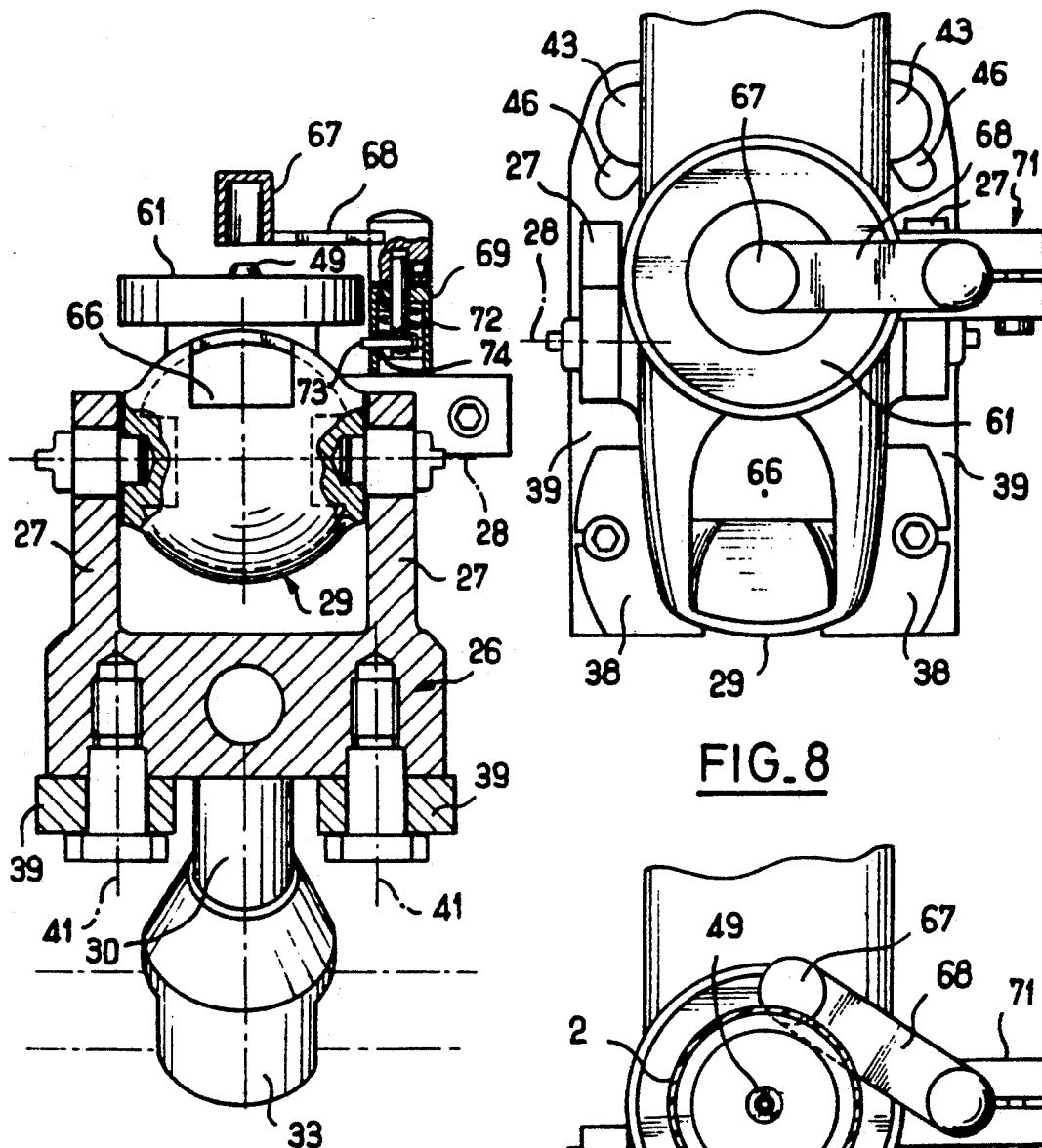
FIG. 5
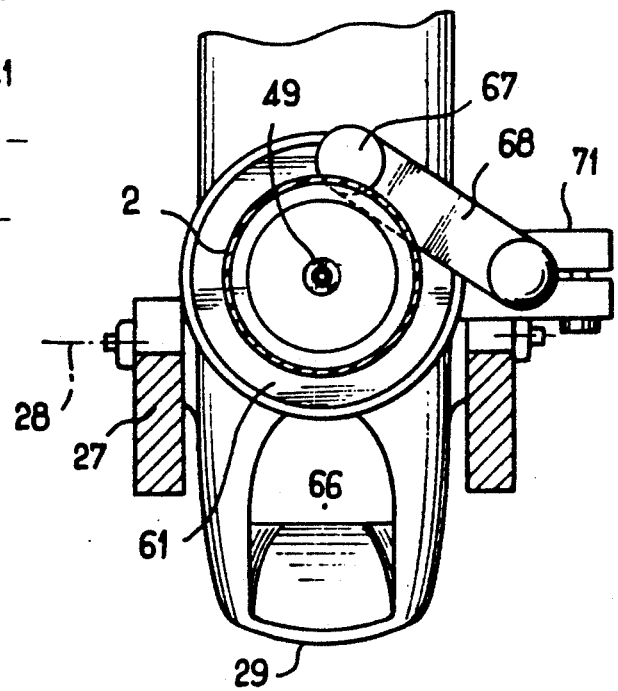
FIG. 8
FIG. 9

GRIPPER CLAMP AND MACHINE FOR TREATING OBJECTS, PARTICULARLY BOTTLES, EQUIPPED THEREWITH

The present invention relates to a gripper clamp, particularly for gripping fragile objects such as bottles, said clamp being intended to form part of a treatment machine for such objects.

The present invention also relates to a machine of this kind.

For the purpose of gripping an object in a machine with the aid of a clamp, the prior art teaches the application to said object, by means of the clamp, of a clamping force sufficient to avoid the risk that the weight of this object and any other forces to which it may be subjected because of the handling operation and which may be added to the weight, will open out the jaws of the clamp and cause the object to fall. If it is desired to accelerate the handling operations in the machine, that is to say to increase the working rate of the machine, the inertia forces of which each object is the seat will increase and it is therefore necessary to increase the clamping force of the clamps. However, a substantial clamping force endangers the objects if they are fragile, for example when they are bottles.

The aim of the invention is thus to propose a clamp and a bottle treatment machine which make it possible to handle fragile objects, which may be bottles, rapidly and very safely.

According to the invention, the gripper clamp, particularly for fragile objects, and more particularly for bottles, which is intended to form part of an automatic treatment machine, comprising at least two jaws movable relative to one another between a gripping position and a release position, at least one of the jaws being movable and connected for that purpose to actuating means, transmission means being functionally interposed between the actuating means and the movable jaw in order to transmit to the movable jaw its movements between the release position and the gripping position, is characterized in that said transmission means is irreversible at least in respect of the return of the movable jaw to its release position from the gripping position.

Thus, even if the clamping force applied to the object by the actuating means is weak, the object cannot be freed from the clamp because the transmission means between the actuating means and the jaws is irreversible, that is to say the jaws cannot transmit any significant displacement to the actuating means.

According to the second object of the invention, the machine for treating objects, particularly bottles, comprising at least one clamp for individually gripping each object, is distinguished in that the clamp is made in accordance with the first object.

Other features and advantages of the invention will also emerge from the following description of a nonlimitative example.

In the accompanying drawings:

FIG. 1 is a schematic top view of a rotary roundabout treatment machine according to the invention;

FIG. 2 is a schematic view in axial section of the machine on the line II—II in FIG. 1;

FIG. 3 is a view in elevation, partly in section, of a treatment device of the machine shown in FIGS. 1 and 2, the bottle being in the upright position;

FIG. 5 is a front view of the device with parts in section and parts broken away;

FIG. 6 is a top plan view of the clamp, with the arms and tenons in section, and in two different positions;

FIG. 7 is a view of the clamp in lateral elevation, in two different positions, with parts in section and parts broken away, and FIGS. 8 and 9 are top plan views of the front part of the device, without a bottle being present and with a bottle in the inverted position respectively.

Figure 4:
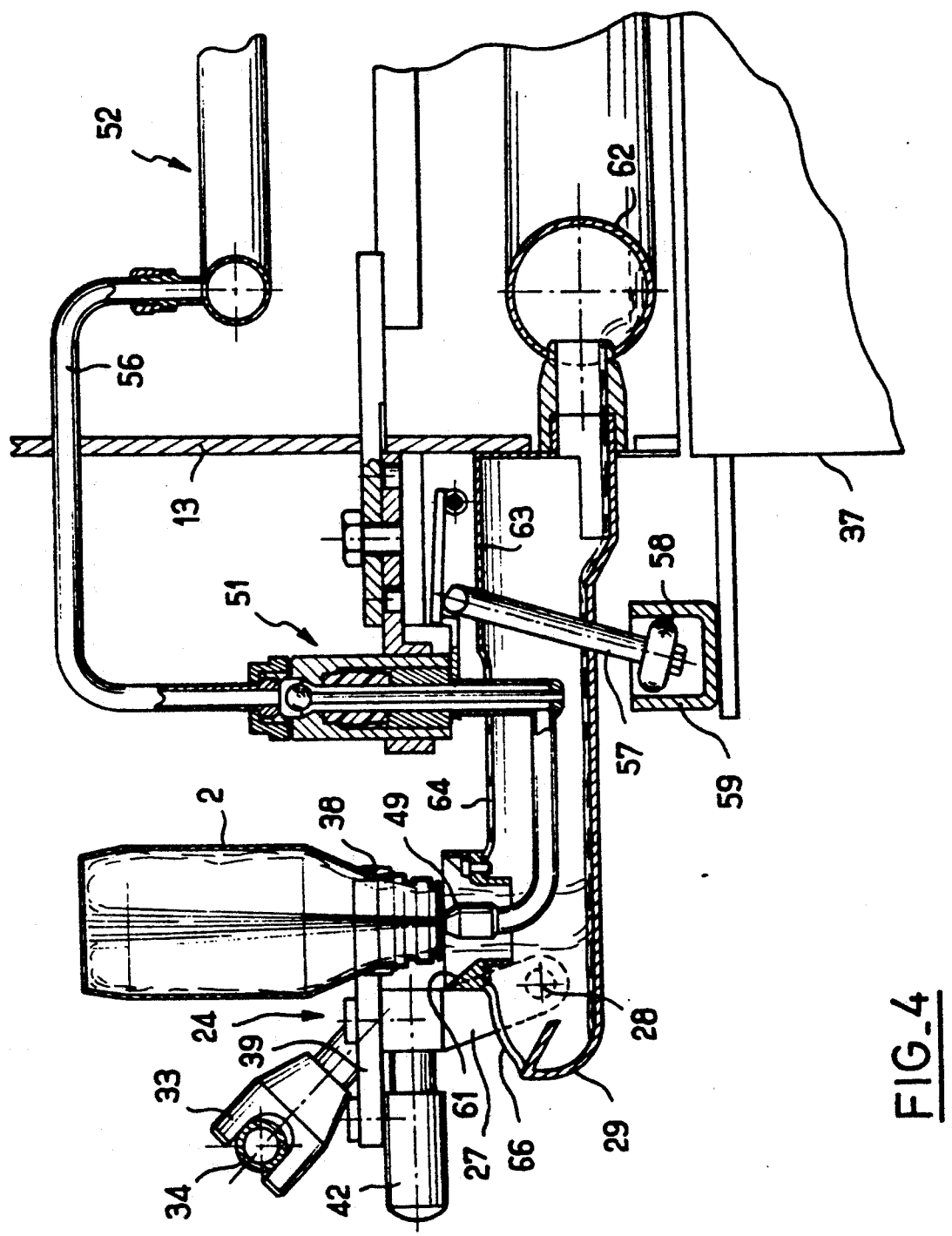
FIG. 4 is a similar view to FIG. 3, but showing the bottle subjected to an injection in the inverted position.

The machine shown in FIGS. 1 and 2 is intended to be inserted in a bottle treatment chain. It comprises an inlet conveyor 1 receiving the bottles 2 coming from the upstream part of the chain, and an outlet conveyor 3 which passes the bottles 2 to the downstream part of the chain.

Along the inlet conveyor 1 is disposed a spacer screw 4 of known type, which gives the successive bottles 2 a spacing and a speed of passage which are predetermined in such a manner as to synchronize the bottles 2 with compartments 6 formed on the periphery of an inlet star wheel 7. The compartments 6 pass above the conveyor 1 and receive the successive bottles 2 in order to propel them along a semicircular path defined by a guide edge 8 of a guide plate 9. This semicircular path, along which the bottles slide with their bottoms on a floor 11, brings the bottles 2 from the inlet conveyor 1 to bottle treatment devices 12 mounted in crown-like distribution on the outer side wall of a rotary roundabout 13. Along the periphery of the roundabout 13 the treatment devices have a circumferential spacing relative to one another which corresponds to the space between successive bottles on the star wheel 7.

Through the rotation of the roundabout 13 the treatment devices 12 pass in succession through a bottle gripping station 14, a bottle inversion station 16, an injection station 17, a bottle re-erection and draining station 18, and a station 19 for transferring the treated bottles to an outlet star wheel 21, which is similar to the inlet star wheel 7 and which passes the treated bottles from the transfer station 19 to the outlet conveyor 3 on a semicircular path along which the bottles slide with their bottoms on the floor 11 and follow another curved guide edge 22 of the plate 9.

The outlet conveyors 21 and 3 are preferably physically composed of a single conveyor, above which the plate 9 is fixed.

The machine is protected and soundproofed by peripheral panels 23, at least some of which are transparent and/or can be opened for maintenance and detailed inspection purposes.

As shown in FIGS. 2 to 4, each treatment device 12 comprises a clamp 24, the purpose of which is to grip by its neck the bottle 2 arriving in front of it in the gripping station, and then to handle the bottle during the inversion and re-erection operations, and finally to release the bottle at the transfer station 19.

Each gripper clamp thus comprises a clamp body 26 (FIGS. 5 to 7) in the form of a clevis comprising two arms 27 articulated on a substantially horizontal common axis 28 to two opposite sides of a body 29 of the treatment device. The body 29 is fixed to the rotary frame 31 of the roundabout (FIGS. 2 and 3), and it is extended radially towards the outside from the rotary frame 21, in relation to the substantially vertical axis of rotation 32 of the roundabout 13. The axis 28 is situated close to the radially outer end of the body 29. The axis 28 is called the "Inversion axis", because it is around that axis that the bottles 2 pivot for their inversion and re-erection movements. For this purpose the clamp body 26 carries a finger 30 ending in a fork 33, preferably made of plastic material having a low coefficient of friction and good wear resistance. A movement control bar 34 is engaged in the fork 33. As shown in FIG. 1, the movement control bar 34 extends around the roundabout 13 and, as shown in FIG. 3, it is fixed for example by brackets 36 to the fixed frame 37, which is situated under the rotary frame 31 and rotatably supports the latter.

In the representation in FIG. 3, the movement control bar 34 is viewed as if, starting from the sectional plane of FIG. 3, the observer's viewing direction were not a straight line at right angles to the plane of the drawing, but a curve centered on the axis of rotation of the roundabout. It is thus that part 34a of the bar 34 which controls the inversion movement of the bottles 2, and which is in reality a helix having a circular axis, appears in FIG. 3 as being a semicircle centered on the inversion axis 28.

As shown in FIG. 6, the clamp 24 comprises two jaws 38 of plastic material, each fixed to a rigid branch 39. The two branches 39 are articulated to the body 26 on two axes 41 parallel to one another and at right angles to the inversion axis 28. The jaws 38 are thus movable between a gripping position (top part of FIG. 6), in which they are relatively close to one another and can retain between them the neck of a bottle, and a release position (bottom part of FIG. 6), in which they are relatively distant from one another and enable the neck of a bottle coming from the inlet star wheel 7 to be engaged between them, or to be disengaged from them in order to be taken up by the outlet star wheel 21.

The clamp also comprises an actuating slide 42, consisting of a cap of plastic material mounted slidably on a cylindrical end piece 43 of the clamp body 26. The cap 42 carries laterally two opposite lugs 43, each of which in turn carries rigidly a tenon 44 extending parallel to the axes 41. Each of the tenons 44 is engaged in a slot 46 in one of the branches 39. Each slot 46 has opposite longitudinal edges 46a and 46b, which are parallel, rectilinear and inclined relative to the displacement axis 47 of the actuating slide 42. The branches 39, and in particular the jaws 38, axes 41 and slots 46, are disposed symmetrically in relation to the axis 47. Thus, the edges 46a and 46b of the inclined slots 46 form a ramp for the actuation of the jaws 38 by the tenons 44 when the slide 42 is displaced along its axis 47, in such a manner that the jaws 38 pivot towards their gripping position and towards their release position respectively. As shown in FIG. 6, the inclination of the slots 46 relative to the direction 47 varies on the pivoting of the branches 39, but always remains oriented in the same direction. In other words, in the example illustrated, it can be seen in FIG. 6 that, whatever the position of the jaws 38, the slots 46 converge towards the axis 47 in the opposite direction to the jaws 38.

The two systems of tenons 44 and slots 46 constitute irreversible means of transmission between the slide 42 and the jaws 38. This means that it is impossible to displace the slide 42 by applying a force to the jaws 38. Irreversibility is particularly desirable in respect of the opening of the jaws 38 from the gripping position shown at the top in FIG. 6. A force F1 exerted on the jaws 38 in the opening direction from the gripping position gives rise to a support point P between the edge 46a and the tenon 44, and tends to displace said point P in the direction D which is circumferential in relation to the axis 41 of the branch 39. In order to ensure the abovementioned irreversibility the angle B between the direction D and the normal N to the edge 46a, starting from the point P, is an acute angle of slight value, whereas the angle C between the direction D and the displacement axis 47 is close to 90 degrees.

In the example illustrated the transmission means is irreversible in all positions of the jaws and in respect of both its directions of movement.

It is therefore the slide 42 that controls the two directions of movement of the jaws. A return spring 45 (FIG. 7) is mounted in the tubular end piece 43 of the clamp body 26 and permanently urges the slide 42 towards a projecting position corresponding to the gripping position of the jaws 38.

The treatment machine also comprises a cam 48 made in the form of a flat steel section (see also FIG. 1), which cooperates with the free end of the slide 42 to drive in the slide 42 against the action of the return spring 45 when the jaws 38 have to be moved from their gripping position to their release position, as shown at the bottom in FIG. 6.

As shown in FIG. 1, the cam 48 is situated only in that region of the periphery of the roundabout 13 in which the gripper jaws of each treatment device have to be moved from the gripping position to the release position (transfer station 19), to be held in the release position (passage from the transfer station to the gripping station) and then to be brought back to the gripping position (gripping station 14). Along the remainder of the periphery of the roundabout 13, as also shown at the top in FIG. 6, the return spring 45 holds the slide 42 in the position in which the jaws 38 bear against the neck 2 of a bottle undergoing treatment. The spring 45 need not be very powerful; it is sufficient for it to be able to bring the jaws 38 reliably into contact with the neck 2, without necessarily exerting a clamping action on the neck of the bottle 2; in fact, because of the irreversibility of the transmission means 44, 46, the bottle 2 cannot, through the action of its dead weight or of its inertia during handling operations, bring about the movement of the jaws 38 away from one another or become disengaged from the jaws 38.

Thus, as illustrated in FIG. 3, each clamp 24 is able to grip a bottle 2 in the upright position under the body 29 and to pivot it 180° around the free end of the body 29 under the control of the control bar 34, in order to bring the bottle into an inverted position (FIG. 4), in which its neck is situated just above a fluid injection nozzle 49. The nozzle 49 is connected by means of a valve 51, fixed to the body 29, to a pressurized supply device 52 which is installed inside the roundabout 13 and which may for example include a pump 53 (FIG. 2) delivering into an annular pipe 54 to which are connected all the connections 56 to the valve 51 of all the treatment devices 12 of the machine.

Each valve 51 is controlled by a lever 57 which is movable between a closed valve position, shown in FIG. 3, and an open valve position shown in FIG. 4. The lever 57 carries at its end a roller 58 which is engaged in a U-shaped control rail 59, which is fixed to the fixed frame 37 of the machine and extends around said frame, as can be seen in FIG. 1. The control rail 59 is circular and centered on the axis 32 of the rotary roundabout, except along the injection station 17, in such a manner as to cause each valve 51 to pass to the open position at the injection station 17 and to hold it in the closed position along all the other stations of the treatment machine.

Consequently, when a bottle 2 is at the injection station, as illustrated in FIG. 4, the nozzle 49 delivers a jet of fluid into the interior of the inverted bottle 2, through its neck. This fluid strikes against the inside wall of the bottle 2 and trickles down the latter before passing out of the bottle 2 by way of the neck of the latter.

The fluid thus flowing is collected through a funnel 61 which is situated just below the neck of the bottle 2 and which surrounds the nozzle 49 with a certain radial clearance between the outside wall of the nozzle 49 and the inside wall of the funnel 61. The opening defined by the funnel 61 gives access to the interior of the body 29, which constitutes an individual receptacle for the collection of the fluid falling back from the bottle 2.

By the expression "individual receptacle" it is intended to designate a receptacle of relatively small size, allocated to a single treatment device and turning with the roundabout 13 so as to remain under the necks of the bottles 2 undergoing treatment, particularly along the injection station 17.

At its radially inner end the receptacle 29 is in communication with an annular collector 62 mounted in the rotary roundabout 13 for the purpose of collecting the liquid falling back from the bottles 2 and coming from all the receptacles 29.

In the example illustrated this fluid is a liquid. It may be a rinsing liquid such as water, which will be conducted from the collector 62 to the drain. It may also be a bottle coating liquid whose cost is relatively high and which will be conducted from the collector 62 via a filtration and recycling device to the pump 53 (FIG. 2). In a manner not illustrated, the fluid injected by the nozzle 49 may be a gas which it is not desired to discharge in large amounts to the atmosphere, in which case the collector 62 is connected to a suction source.

The receptacle 29 has a top closure 63 in which, in addition to the opening defined by the funnel 61, there are provided an opening 64 in which the base of the valve 51 is engaged, and a drip collection opening 66. The latter is disposed in the radially outer end of the receptacle 29, that is to say that end of the receptacle 29 which is surrounded by the trajectory of the clamp 24 and of the bottle 2 carried by it between the upright and inverted positions of the latter. FIG. 3 shows in dot-dash lines a position 2a assumed by the bottle 2 in the course of its return travel from the inverted position to the upright position along the bottle re-erection station 18 shown in FIG. 1. The position 2a, inclined less than 90° relative to the inverted position, promotes the draining of the bottle after the injection undergone along the injection station, and the receptacle 29 collects the product of this drainage by way of the opening 66.

As shown in FIGS. 5, 8 and 9, a cap 67 is carried above the funnel 61 by an arm 68, which at its opposite end to the cap 67 is rotatably supported in a bearing 69 clamped in a collar 71 welded on one side of the body-receptacle 29. The cap 67 is thus movable between the position shown in FIGS. 5 and 8, in which it is situated just above the nozzle 49, and a disengagement position of the nozzle 49 and funnel 61, which is shown in FIG. 9.

In the bearing 69 is mounted a helical spring 72 which operates by winding and which returns the cap 67 to the position in which it is situated above the nozzle 49. If an injection of liquid takes place in the absence of bottles 2, for example at the commencement of the operation of the machine, the injection is made inside the cap, which is so shaped as to return to the receptacle 29, via the funnel 61, the fluid thus injected. When a bottle reaches the inverted position (FIG. 9), it strikes against the cap 67 or the arm 68 and thus pushes them back to the position which disengages the funnel 61 against the action of the return spring 72. The injection is therefore made into the bottle. A snug 73 is rotatable with the cap 67 and with the arm 68 inside the bearing 69 and travels in a circumferential slot 74 in the bearing 69, the circumferential ends of said slot forming a stop limiting the angular travel of the cap 67 about the axis defined by the bearing 69.

The operation of the treatment machine will now be explained:

The bottles 2 brought by the inlet conveyor 1 and suitably spaced by the spacer screw 4 are delivered by the inlet star wheel 7 to the successive treatment devices 12. The cam 48 controls the closing of each clamp 24 at the moment when the inlet star wheel 7 has placed a bottle between its jaws.

After the closing of a clamp, the guide bar 34 controls, by its helical region 34a, the progressive inversion of the bottle 2 in question, this inversion being completed at the beginning of the injection station 17 slightly before the control rail 59 brings about the opening of the valve 51 and consequently the injection of fluid through the nozzle 49. After the injection the bottle is held for a certain time in the inverted position in order to enable it to drain, and thereupon the control bar 34 brings about the re-erection of the bottle along the re-erection station 18 until the bottle is received in one of the compartments of the outlet star wheel 21, whereupon the cam 48 brings about the opening of the clamp to enable the bottle to be conducted from the transfer station 19 to the outlet conveyor 3.

The invention is obviously not limited to the example described and illustrated. The slots 46 in the clamp, instead of being rectilinear, could have a curvature compensating for the pivoting of the branches 39 about their axes 41, in such a manner that the region of the slots 46 in which the tenons 44 are situated will always have the same inclination relative to the axis 47.

I claim:

1. In a gripper clamp for bottles comprising at least two jaws movable and articulated relative to one another between a gripping position and a release position, at least one of the jaws being movable by actuating means which undergo a translatory movement in a direction forming an axis of symmetry for the two jaws, transmission means between the actuating means and the movable jaw to transmit to the movable jaw movement between the release position and the gripping position, said transmission means comprising a tenon movable against an inclined ramp, the tenon and the ramp being associated one with the movable jaw and the other with the actuating means; the improvement wherein the actuating means comprises a translatable member cooperating with a cam of a treatment machine, and a return spring continuously urging the actuating means toward a position corresponding to the gripping position of the jaws in contact with the bottle, and wherein the ramp converges toward said axis of symmetry in a direction away from the jaws with an inclination such that said transmission means is irreversible in respect of the return of the movable jaw to its release position from the gripping position upon the imposition of force on that portion of the jaw that contacts the bottle.

2. A gripper clamp as claimed in claim 1, wherein said cam is stationary and said translatable member slides along said cam and is urged by said cam in a direction to move the movable jaw toward said gripping position, said return spring urging said translatable member against said cam.

3. A gripper clamp as claimed in claim 1, said ramp comprising an edge of a slot in the movable jaw.

* * * * *